US012728709B2

(12) United States Patent
Padwal et al.

(10) Patent No.: US 12,728,709 B2
(45) Date of Patent: Sep. 8, 2026

(54) DOOR FOR WORK MACHINE

(71) Applicant: Caterpillar Inc., Peoria, IL (US)

(72) Inventors: Yogesh Govind Padwal, Pimpri-Chinchwad (IN); Ashokkumar Kuppan, Chennai (IN); Joel Nicholas Thieschafer, Maple Grove, MN (US); Emile Antonios Ghantous, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 341 days.

(21) Appl. No.: 18/517,081

(22) Filed: Nov. 22, 2023

(65) Prior Publication Data

US 2025/0162389 A1 May 22, 2025

(51) Int. Cl.
*B60J 5/04* (2006.01)

(52) U.S. Cl.
CPC .......... *B60J 5/0487* (2013.01); *B60J 5/0402* (2013.01)

(58) Field of Classification Search
None
See application file for complete search history.

(56) References Cited

U.S. PATENT DOCUMENTS 4,940,280 A * 7/1990 Templeton .............. B60R 21/11 280/756
5,125,716 A * 6/1992 Smith .................... B60J 5/0487 49/501
5,655,798 A * 8/1997 Kaveney ................ B60J 5/0487 292/DIG. 3
8,496,282 B2 * 7/2013 Murakami ............ E05B 1/0015 296/65.05
9,279,234 B1 3/2016 Gielda et al.
11,376,929 B2 7/2022 Pennings et al.

FOREIGN PATENT DOCUMENTS

| | | | |
|---|---|---|---|
| CN | 201863688 | 6/2011 | |
| CN | 203175317 | * 9/2013 | |
| CN | 203175317 U | 9/2013 | |
| CN | 110789313 | 2/2020 | |
| GB | 2596778 A | * 1/2022 | E05B 53/001 |
| JP | S63148515 | * 9/1988 | |
| JP | S63148515 U | 9/1988 | |
| JP | 2004024171 | 1/2004 | |
| WO | WO 2015198999 | * 12/2015 | |

OTHER PUBLICATIONS

European Patent Office Search Report for EP Patent Application No. 24208242.8, mailed Mar. 28, 2025 (09 pgs).

* cited by examiner

*Primary Examiner* — Joseph D. Pape

(57) ABSTRACT

A door for a work machine includes a first section having a first glass portion and a handrail coupled to the first glass portion. The door also includes a second section having a frame portion and a second glass portion. The door further includes a first latching mechanism movable between a first engaged state and a first disengaged state. In the first engaged state, the first section engages with the second section. In the first disengaged state, the first section is disengaged from the second section. The door includes a second latching mechanism coupled to the second section. The second latching mechanism is movable between a second engaged state and a second disengaged state. In the second engaged state, the second section engages with a frame of an operator cabin of the work machine. In the second disengaged state, the second section is disengaged from the frame of operator cabin.

20 Claims, 7 Drawing Sheets

DOOR FOR WORK MACHINE

TECHNICAL FIELD

The present disclosure relates to a work machine, and more particularly, to a door for the work machine.

BACKGROUND

A work machine, such as a compactor, includes an operator cabin. The work machine may be used to perform one or more work operations, such as a compaction operation. The operator cabin typically includes a door coupled to a frame of the operator cabin to allow the operator to board or deboard the work machine. The door may further include a window portion that may provide an outside view to the operator.

It may be desirable for the operator seated within the operator cabin to view ongoing work operations. However, a design of the conventional door of the work machine may limit a field of view of the operator, which may reduce an efficiency of the work operations. For example, it may be desirable to monitor edges of drums of the work machine during the compaction operation. Moreover, in some cases, the door may provide limited ambient lights inside the operator cabin that may have an undesirable impact on the operator's driving experience. Further, the door may have a heavy design and may be cumbersome to open and close. Therefore, an improved design of the door may be desired to address the above-described shortcomings.

CN110789313 discloses a double-glass door structure of an engineering machinery cab, which comprises an upper glass door and a lower glass door, wherein the upper glass door and the lower glass door are independently opened and closed respectively; the upper glass door and the lower glass door are both fixedly arranged on the door frame through a first hinge; the lower glass door is provided with a lower handrail, and the upper part of the lower handrail is fixedly provided with a supporting arm component; the invention can enlarge the side view of the cab, avoid dead driving angles, observe the side engineering condition, improve the operation quality, have high working efficiency and improve the driving safety; the window can be enlarged, the daylighting performance of the cab is improved, the limitation of space is avoided, the cab door is in accordance with the ergonomic design, fatigue can be relieved, and the driving experience and comfort are improved; the sealing performance of the cab door after being closed can be improved, the inside and the outside of the cab are effectively isolated, and the security and the waterproofness are improved; the door closing device has a buffering effect, and vibration and noise generated when the door is closed are reduced.

SUMMARY OF THE DISCLOSURE

In an aspect of the present disclosure, a door for a work machine is provided. The door includes a first section. The first section includes a first glass portion. The first glass portion defines a first surface and a second surface opposite the first surface. The first section also includes a handrail coupled to the first glass portion at the first surface of the first glass portion. The handrail is disposed proximal to a periphery of the first glass portion and extends along an entirety of the periphery of the first glass portion. The door also includes a second section. The first section is movable relative to the second section. The second section includes a frame portion defining a third surface and a fourth surface opposite the third surface. The second section also includes a second glass portion. The door further includes a first latching mechanism movable between a first engaged state and a first disengaged state. In the first engaged state of the first latching mechanism, the first section engages with the second section. In the first disengaged state of the first latching mechanism, the first section is disengaged from the second section. The door includes a second latching mechanism coupled to the second section. The second latching mechanism is movable between a second engaged state and a second disengaged state. In the second engaged state of the second latching mechanism, the second section engages with a frame of the operator cabin of the work machine. In the second disengaged state of the second latching mechanism, the second section is disengaged from the frame of the operator cabin.

In another aspect of the present disclosure, a work machine is provided. The work machine includes an operator cabin. The operator cabin includes a frame. The work machine also includes a door movably coupled to the frame of the operator cabin. The door includes a first section. The first section includes a first glass portion. The first glass portion defines a first surface facing an interior of the operator cabin and a second surface opposite the first surface. The first section also includes a handrail coupled to the first glass portion at the first surface of the first glass portion. The handrail is disposed proximal to a periphery of the first glass portion and extends along an entirety of the periphery of the first glass portion. The door also includes a second section. The first section is movable relative to the second section. The second section includes a frame portion defining a third surface facing the interior of the operator cabin and a fourth surface opposite the third surface. The second section also includes a second glass portion. The door further includes a first latching mechanism movable between a first engaged state and a first disengaged state. In the first engaged state of the first latching mechanism, the first section engages with the second section. In the first disengaged state of the first latching mechanism, the first section is disengaged from the second section. The door includes a second latching mechanism coupled to the second section. The second latching mechanism is movable between a second engaged state and a second disengaged state. In the second engaged state of the second latching mechanism, the second section engages with the frame of the operator cabin. In the second disengaged state of the second latching mechanism, the second section is disengaged from the frame of the operator cabin.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
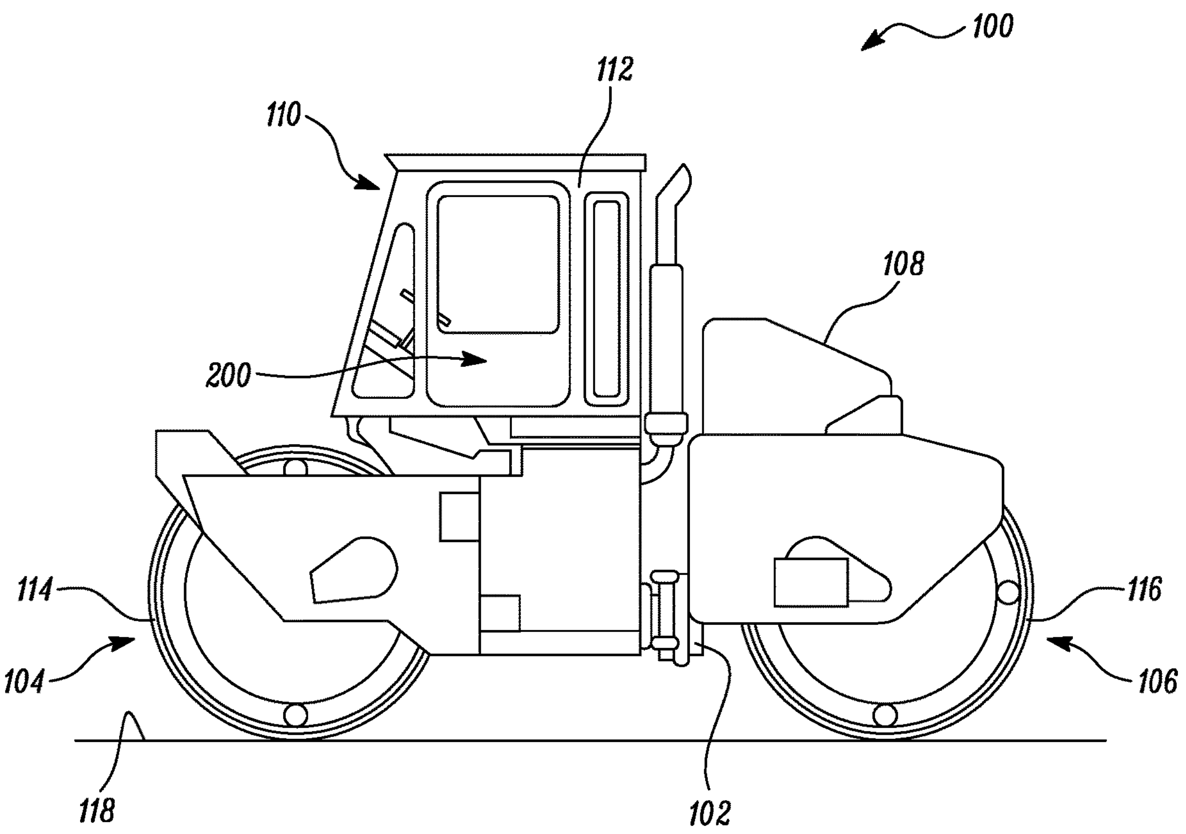
FIG. 1 is a schematic side view of an exemplary work machine, according to an example of the present disclosure.

Referring to FIG. 1, a schematic side view of an exemplary work machine 100 is illustrated. In the illustrated example of FIG. 1, the work machine 100 includes a compactor. However, the work machine 100 may embody any other machine, such as, a dozer, a motor grader, an excavator, and the like, having an enclosed operator cabin/operator station. The work machine 100 includes a base frame 102, a front end 104, and a rear end 106 opposite the front end 104. The base frame 102 supports various components of the work machine 100 thereon. The base frame 102 defines an enclosure 108 proximate to the rear end 106. The work machine 100 also includes a power source (not shown) disposed within the enclosure 108. Various components of the work machine 100 are operated by the power source. The power source may be an engine, such as, an internal combustion engine, a fuel cell, a battery system, without any limitations.

The work machine 100 further includes a pair of roller drums 114, 116 that are rotatably attached to the base frame 102. Particularly, the roller drum 114 is a forward roller drum disposed at the front end 104 of the work machine 100. The roller drum 116 is a rearward roller drum disposed at the rear end 106 of the work machine 100. Each of the roller drums 114, 116 support the base frame 102 of the work machine 100 and allow the work machine 100 to travel over the ground surface 118. Further, the roller drums 114, 116 contact a work surface to perform one or more work operations, for example, a compaction operator for compacting materials, such as, asphalt, soil, gravel, and the like. In some examples, the work machine 100 may include wheels instead of the roller drums 114, 116.

The work machine 100 includes an operator cabin 110. An operator may be seated within the operator cabin 110 to perform and/or observe work operations. The operator cabin 110 may include one or more controls (not shown) that may enable an operator to control the work machine 100. The operator cabin 110 includes a frame 112. The frame 112 may have sufficient strength and rigidity for maintaining an enclosed space for the operator. The present disclosure relates to a door 200 for the work machine 100. Specifically, the work machine 100 includes the door 200 movably coupled to the frame 112 of the operator cabin 110.

Figure 2:
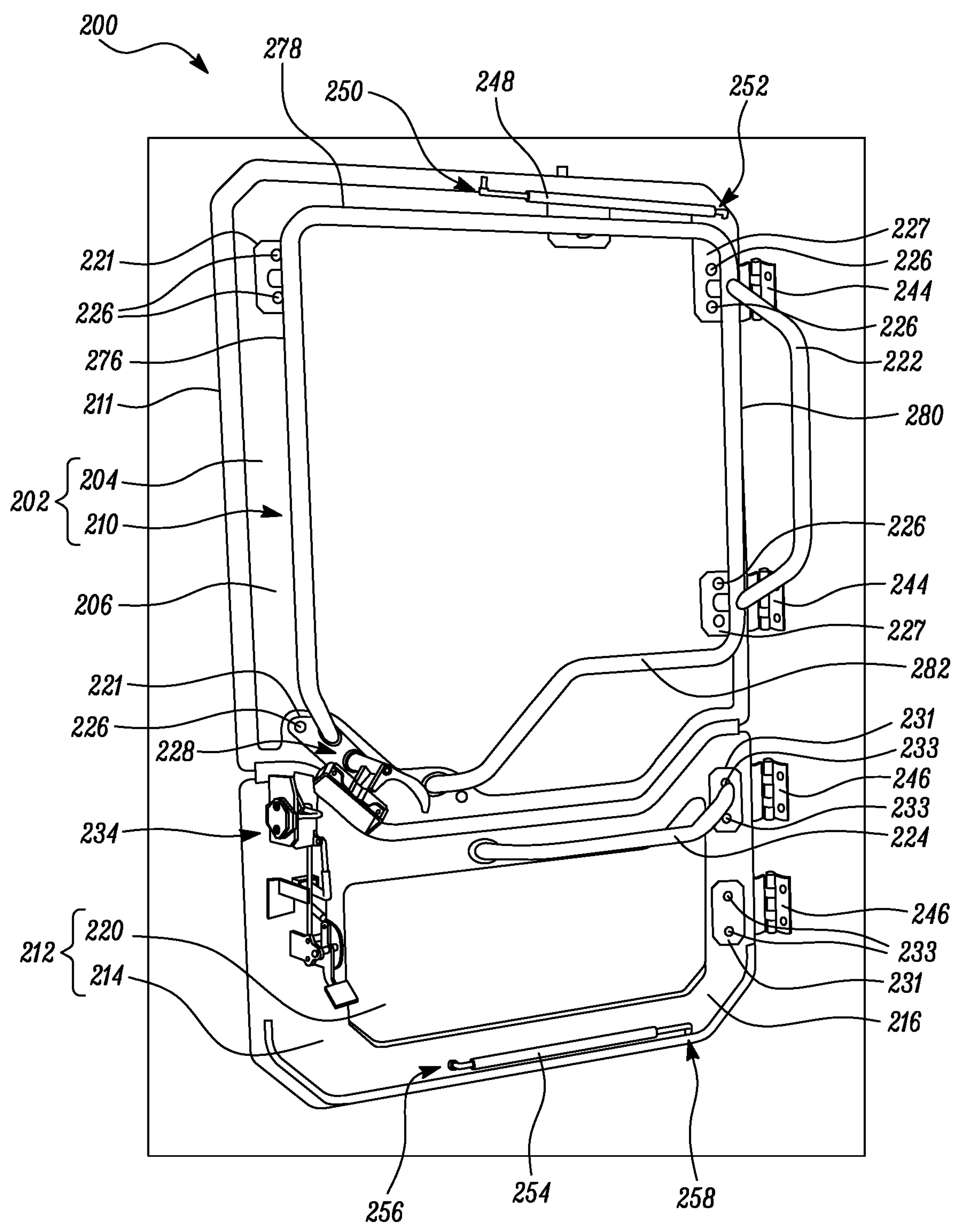
FIG. 2 is a schematic perspective view of a door for the work machine of FIG. 1, according to an example of the present disclosure.

Referring to FIG. 2, a schematic perspective view of the door 200 for the work machine 100 of FIG. 1 is illustrated. The door 200 includes a first section 202. The first section 202 is movable by an angle of at least 180 degrees relative to the frame 112 (see FIG. 1) of the operator cabin 110 (see FIG. 1). In some examples, the first section 202 may be moved by an angle of up to 191 degrees. The first section 202 includes a first glass portion 204. The first glass portion 204 may be made from a tempered glass material that may have a desired strength. The first glass portion 204 defines a first surface 206 and a second surface 208 (shown in FIG. 7) opposite the first surface 206. It should be noted that the first surface 206 of the first glass portion 204 is an internal surface that faces the enclosed space of the operator cabin 110, whereas the second surface 208 is an external surface that faces the outside environment.

The first section 202 also includes a handrail 210 coupled to the first glass portion 204 at the first surface 206 of the first glass portion 204. The handrail 210 is disposed proximal to a periphery 211 of the first glass portion 204 and extends along an entirety of the periphery 211 of the first glass portion 204.

Figure 3A:
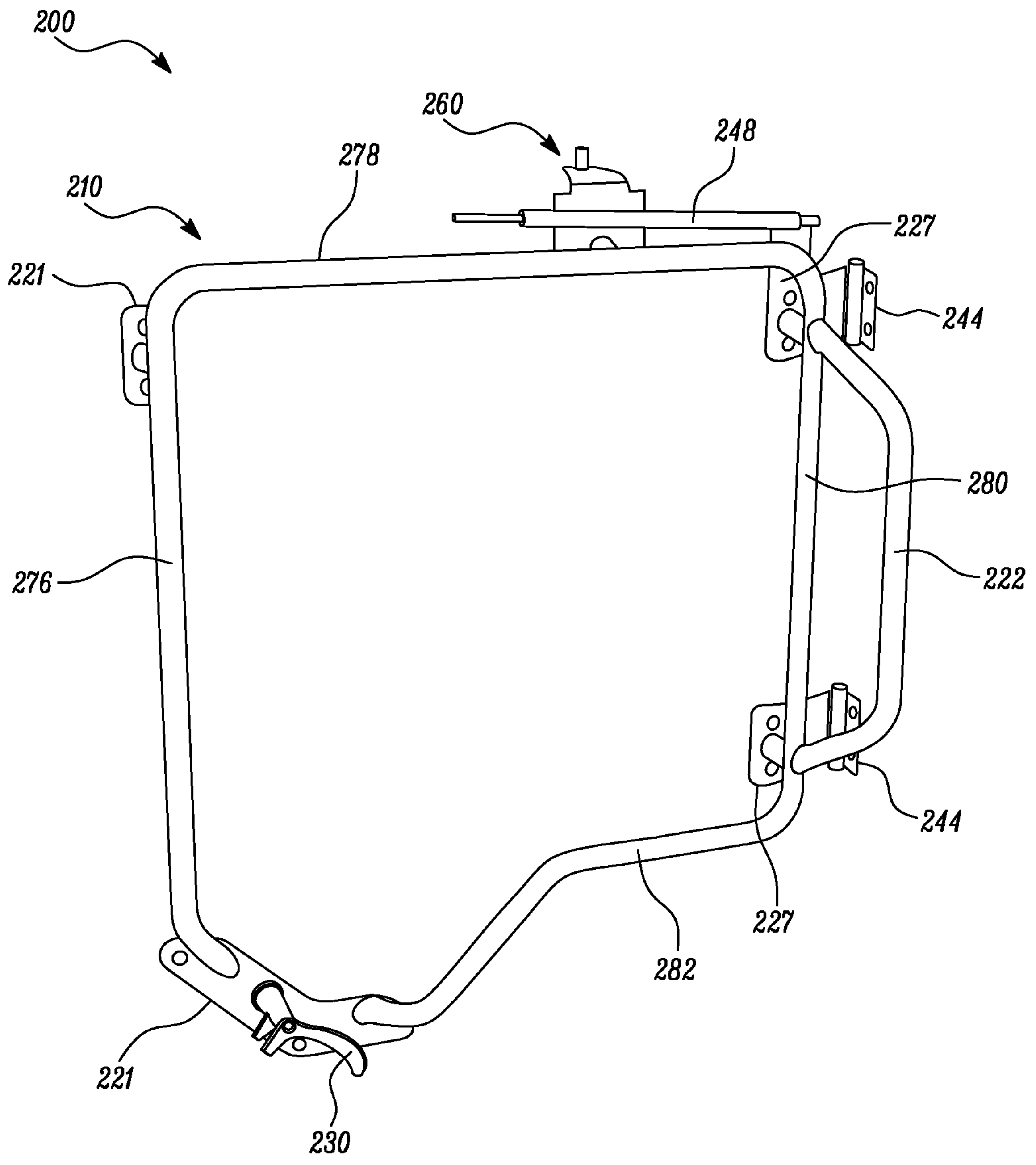
FIG. 3A is a schematic perspective view of a handrail of the door of FIG. 2.

Referring now to FIG. 3A, the handrail 210 includes a first portion 276, a second portion 278, a third portion 280, and a fourth portion 282. Each of the first portion 276, the second portion 278, and the third portion 280 is embodied as a straight portion. Further, the fourth portion 282 has an angled design. In some examples, the handrail 210 may be made of steel. In other examples, the handrail 210 may be made of any metallic material, an alloy, a composite material, and the like, without limiting the scope of the present disclosure.

The handrail 210 also includes a number of first coupling plates 221, 227. The first coupling plates 221, 227 are disposed at the first surface 206 of the first glass portion 204 (see FIG. 2) and are integrally coupled with the handrail 210. Specifically, the handrail 210 includes two first coupling plates 221 integrally connected to the first portion 276 of the handrail 210. Thus, the first portion 276 of the handrail 210 is directly coupled to the first glass portion 204 via the first coupling plates 221. Further, the first coupling plates 221 are coupled with the first glass portion 204 using a number of first fasteners 226 (shown in FIG. 2). The handrail 210 further includes the first coupling plates 227 integrally connected to the third portion 280 of the handrail 210. The handrail 210 also includes two coupling plates 229 (shown in FIGS. 3B and 7). The coupling plates 229 are disposed at the second surface 208 of the first glass portion 204. The third portion 280 of the handrail 210 is coupled to the first glass portion 204 via the first coupling plates 227 and the coupling plates 229.

Figure 3B:
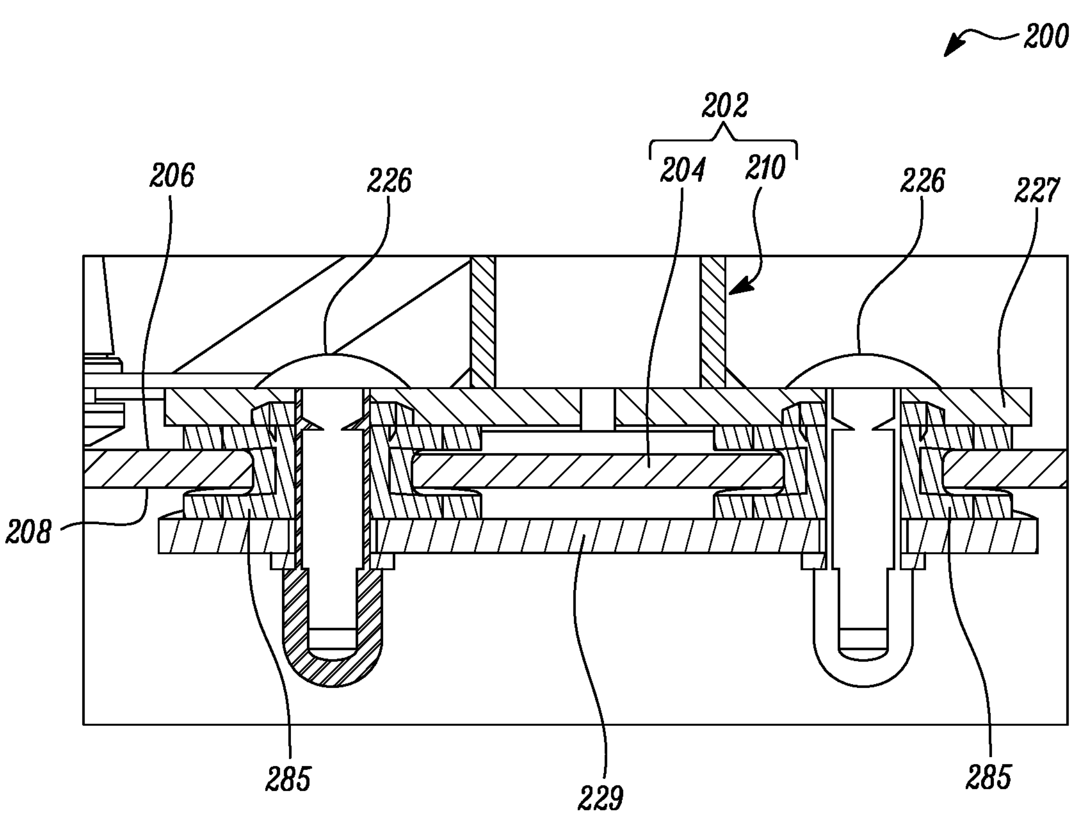
FIG. 3B is a schematic cross-sectional view illustrating a portion of the door of FIG. 2.

Referring to FIG. 3B, a schematic cross-sectional view of a portion of the door 200 is illustrated. FIG. 3B illustrates an attachment of the first coupling plate 227 with the coupling plate 229. As shown in FIG. 3B, the first coupling plate 227 is coupled with the coupling plate 229, such that the first glass portion 204 extends between the first coupling plate 227 and the coupling plate 229. Further, the first section 202 includes a number of first fasteners 226 that couple the first coupling plate 227, the first glass portion 204, and the coupling plate 229 together. Each first coupling plate 227 is coupled with the coupling plate 229 via two first fasteners 226. In some examples, the first fasteners 226 may include a bolt, a screw, a rivet, and the like.

Further, the door 200 includes a number of first seals 285 disposed between the first coupling plate 227 and the corresponding coupling plate 229. Specifically, the first seal 285 is disposed around each first fastener 226. In some examples, the first seal 285 may include a rubber seal. The first seal 285 has a substantially I-shaped cross-section. A portion of the first seal 285 is disposed between the first coupling plate 227 and the first glass portion 204, thereby preventing direct contact between the first coupling plate 227 and the first glass portion 204. Moreover, a portion of the first seal 285 is disposed between the coupling plate 229 and the first glass portion 204, thereby preventing direct contact between the coupling plate 229 and the first glass portion 204. Additionally, a portion of the first seal 285 is radially disposed between the first glass portion 204 and the fastener 226, thereby preventing direct contact between the first glass portion 204 and the fastener 226.

Referring again to FIG. 3A, the first section 202 also includes a first handle 222 fixedly coupled to the handrail 210 of the first section 202. Specifically, the first handle 222 is coupled to the third portion 280 of the handrail 210. In some examples, the first handle 222 may be fixedly coupled to the handrail 210 via welding. In other examples, the first handle 222 may be coupled to the handrail 210 via one or more fastening means, such as, a bolt, a screw, a rivet, or the like. The first handle 222 may allow the operator to move the first section 202 to a closed position.

The door 200 further includes one or more first hinges 244 that movably couple the first section 202 with the frame 112 (see FIG. 1) of the operator cabin 110 (see FIG. 1). The one or more first hinges 244 are coupled to the handrail 210 of the first section 202. Specifically, the first hinges 244 are coupled with the coupling plates 229 of the handrail 210. The door 200 includes two first hinges 244. Each first hinge 244 is coupled to the frame 112 via two fastening elements (not shown). In some examples, the fastening elements may include a bolt, a screw, a rivet, and the like.

Referring again to FIG. 2, the door 200 also includes a second section 212. The first section 202 is movable relative to the second section 212. Further, the second section 212 is movable by an angle of 90 degrees relative to the frame 112 (see FIG. 1) of the operator cabin 110 (see FIG. 1).

The second section 212 includes a frame portion 214. The frame portion 214 defines a third surface 216 and a fourth surface 218 (shown in FIG. 7) opposite the third surface 216. It should be noted that the third surface 216 is an internal surface of the frame portion 214 of the door 200 that faces the enclosed space of the operator cabin 110, whereas the fourth surface 218 is an external surface of the frame portion 214 that faces the outside environment. The second section 212 also includes a second glass portion 220. The second glass portion 220 may be made from a tempered glass material that may have a desired strength. Further, the first and second glass portions 204, 220 may be made from the same type of glass.

Figure 7:
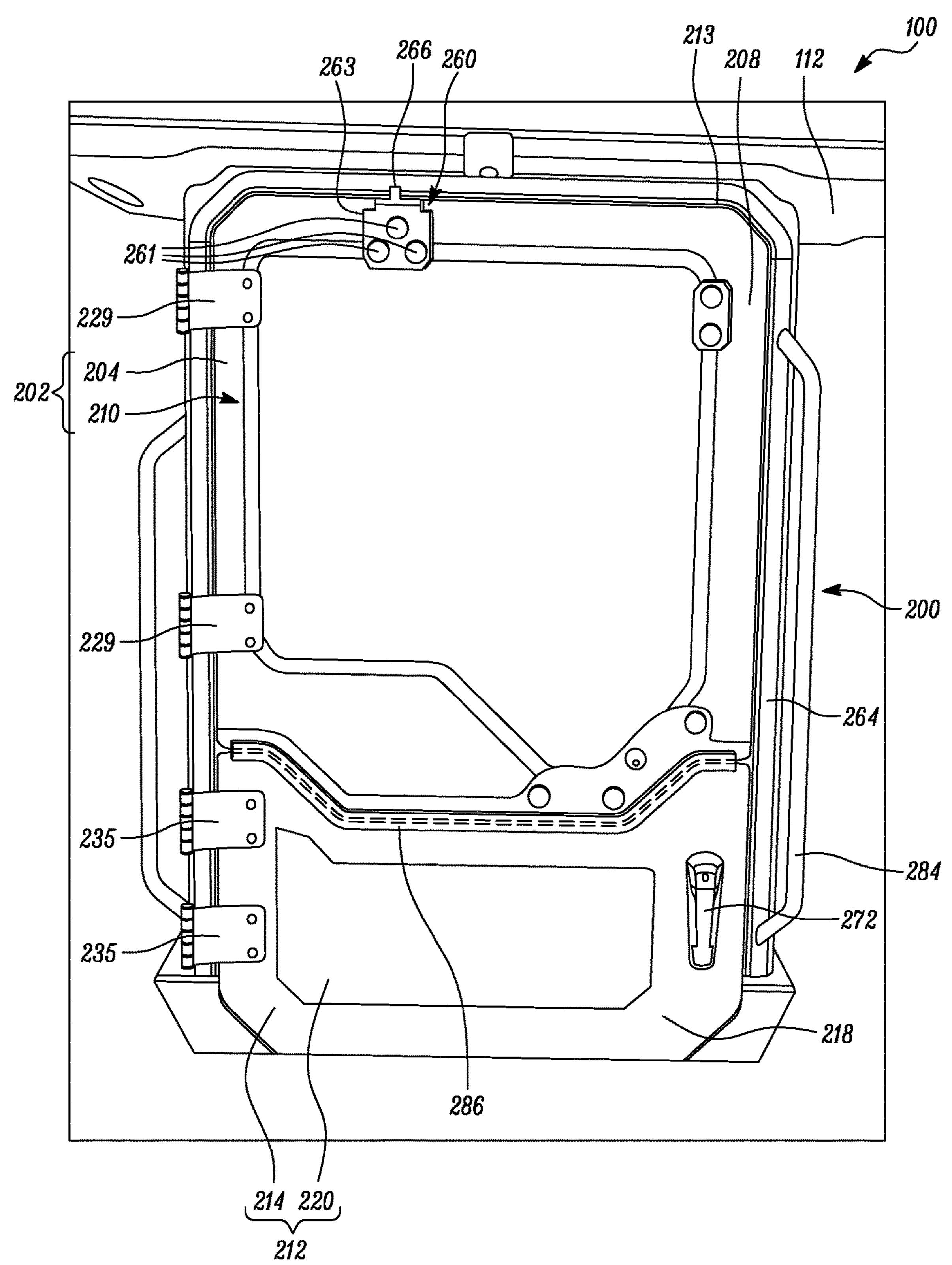
FIG. 7 is a schematic perspective view of the door of FIG. 2 in a closed position.

The second section 212 further includes a number of second coupling plates 231, 235 (shown in FIG. 7). Specifically, the second section 212 includes four second coupling plates 231, 235. The frame portion 214 is coupled to the frame 112 via the second coupling plates 231, 235. Further, the second section 212 includes a number of second fasteners 233 that couple the frame portion 214 with the frame 112 via the second coupling plates 231, 235. Specifically, the second coupling plates 231, the frame portion 214, and the second coupling plates 235 are coupled to each other via two second fasteners 233. In some examples, the second fasteners 233 may include a bolt, a screw, a rivet, and the like. Alternatively, the second coupling plates 231 may be integrally coupled with the frame portion 214.

The door 200 further includes one or more second hinges 246 that movably couple the second section 212 with the frame 112 of the operator cabin 110. The one or more second hinges 246 are coupled to the frame portion 214 of the second section 212. Specifically, each second hinge 246 is pivotally coupled with the corresponding second coupling plate 231. The door 200 includes two second hinges 246. Each second hinge 246 is coupled to the frame 112 via two fastening elements (not shown). In some examples, the fastening elements may include a bolt, a screw, a rivet, and the like.

The second section 212 includes a second handle 224 fixedly coupled to the frame portion 214 of the second section 212. In some examples, the second handle 224 may be fixedly coupled to the frame portion 214 via welding. In other examples, the second handle 224 may be fixedly coupled to the frame portion 214 via one or more fastening means, such as, a bolt, a screw, a rivet, or the like. The second handle 224 may allow the operator to move the second section 212 or the entire door 200 to a closed position.

The door 200 also includes a first gas strut 248. The first gas strut 248 defines a first end 250 coupled to the frame 112 of the operator cabin 110 and a second end 252 coupled to the first coupling plate 227 of the handrail 210. The first gas strut 248 may use compressed gases to mitigate shocks generated due to sudden movement of the first section 202. The first gas strut 248 is shown to be located proximate to a top end of the first section 202. However, the first gas strut 248 may be located elsewhere, without any limitations.

The door 200 further includes a second gas strut 254. The second gas strut 254 defines a third end 256 coupled to the frame portion 214 of the second section 212 and a fourth end 258 coupled to the frame 112 of the operator cabin 110. The second gas strut 254 may use compressed gases to mitigate shocks generated due to sudden movement of the second section 212. The second gas strut 254 is shown to be located proximate to a bottom end of the second section 212. However, the second gas strut 254 may be located elsewhere, without any limitations. The first and second gas struts may have same design and dimensions.

Figure 4:
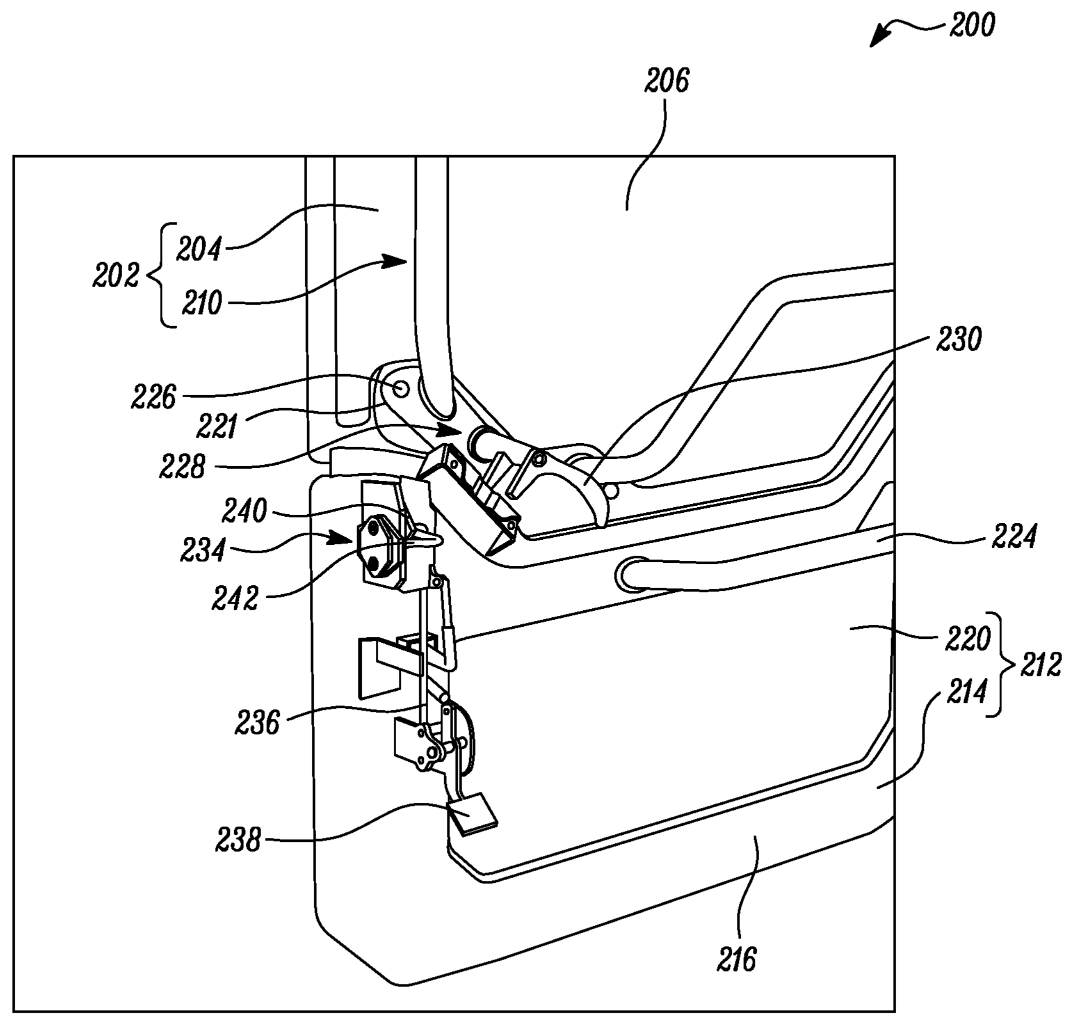
FIG. 4 is a schematic perspective view of a portion of the door of FIG. 2.

Referring now to FIG. 4, the door 200 includes a first latching mechanism 228. The first latching mechanism 228 is movable between a first engaged state (shown in accompanying FIG. 4) and a first disengaged state. In the first engaged state of the first latching mechanism 228, the first section 202 engages with the second section 212. In the illustrated example of FIG. 4, the first latching mechanism 228 is illustrated in the first engaged state, to position the first section 202 in the closed position. In the first disengaged state of the first latching mechanism 228, the first section 202 is disengaged from the second section 212. Accordingly, the first section 202 may be moved relative to the second section 212.

The first latching mechanism 228 includes a latch 230 coupled to the first surface 206 of the first section 202. In the first engaged state of the first latching mechanism 228, the latch 230 engages with the frame portion 214 of the second section 212. In the first disengaged state of the first latching mechanism 228, the latch 230 disengages from the frame portion 214 of the second section 212. The operator may hold and operate the latch 230 in order to move the move the first latching mechanism 228 between the first engaged state and the first disengaged state.

The door 200 also includes a second latching mechanism 234 coupled to the second section 212. The second latching mechanism 234 is movable between a second engaged state and a second disengaged state. In the second engaged state of the second latching mechanism 234, the second section 212 engages with the frame 112 (see FIG. 1) of the operator cabin 110 (see FIG. 1) of the work machine 100 (see FIG. 1). Particularly, in the illustrated example of FIG. 4, the second latching mechanism 234 is illustrated in the second engaged state. In the second disengaged state of the second latching mechanism 234, the second section 212 is disengaged from the frame 112 of the operator cabin 110. Subsequently, the second section 212 may be moved relative to the frame 112 of the operator cabin 110.

The second latching mechanism 234 includes a linkage assembly 236. The second latching mechanism 234 also includes a foot-operated pedal 238 coupled to the linkage assembly 236. The linkage assembly 236 and the foot-operated pedal 238 are coupled to the third surface 216 of the frame portion 214. In order to move the second latching mechanism 234 from the second engaged state to the second disengaged state, the operator may press the foot-operated pedal 238 with their foot. The linkage assembly 236 includes a hook 240 and a staple 242 fixedly coupled to the frame 112 (see FIG. 1) of the operator cabin 110 (see FIG. 1). In the second engaged state of the second latching mechanism 234, the hook 240 engages with the staple 242, thereby locking the second section 212 relative to the frame 112 of the operator cabin 110. Further, when the operator presses the foot-operated pedal 238, the hook 240 disengages from the staple 242, thereby disengaging the second latching mechanism 234 to allow movement of the second section 212 relative to the frame 112.

Figure 5:
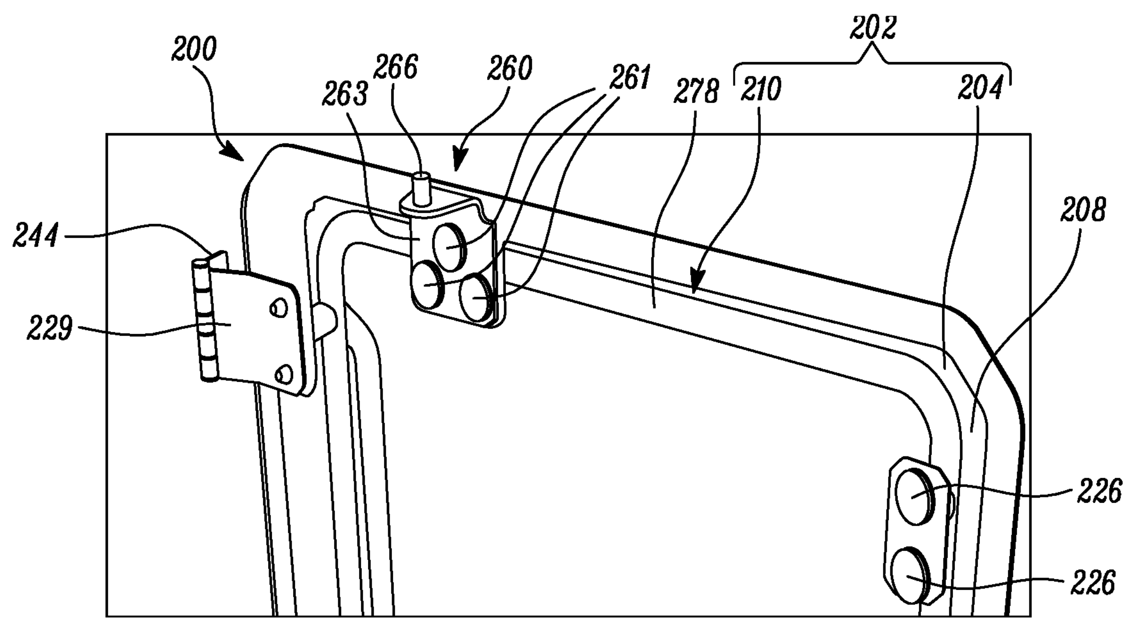
FIG. 5 is a schematic perspective view of a first section of the door of FIG. 2.

Referring to FIG. 5, the door 200 further includes a third latching mechanism 260 coupled to the handrail 210 and extending outwards from the second surface 208 of the first glass portion 204. Specifically, the third latching mechanism 260 is directly coupled to the handrail 210. The third latching mechanism 260 includes a bracket 263. The bracket 263 is coupled to the handrail 210 via three third fasteners 261. The third fasteners 261 may include a bolt, a rivet, a screw, and the like. The third fasteners 261 pass through the bracket 263 of the third latching mechanism 260 and the first glass portion 204 to connect to the second portion 278 of the handrail 210. In an open position of the first section 202, the third latching mechanism 260 engages with the frame 112 (see FIG. 1) of the operator cabin 110 (see FIG. 1) to retain the first section 202 in the open position. Specifically, the third latching mechanism 260 includes a striker 266 that engages with a retaining member (not shown) fixedly coupled to the frame 112 of the operator cabin 110 to retain the first section 202 in the open position.

Figure 6:
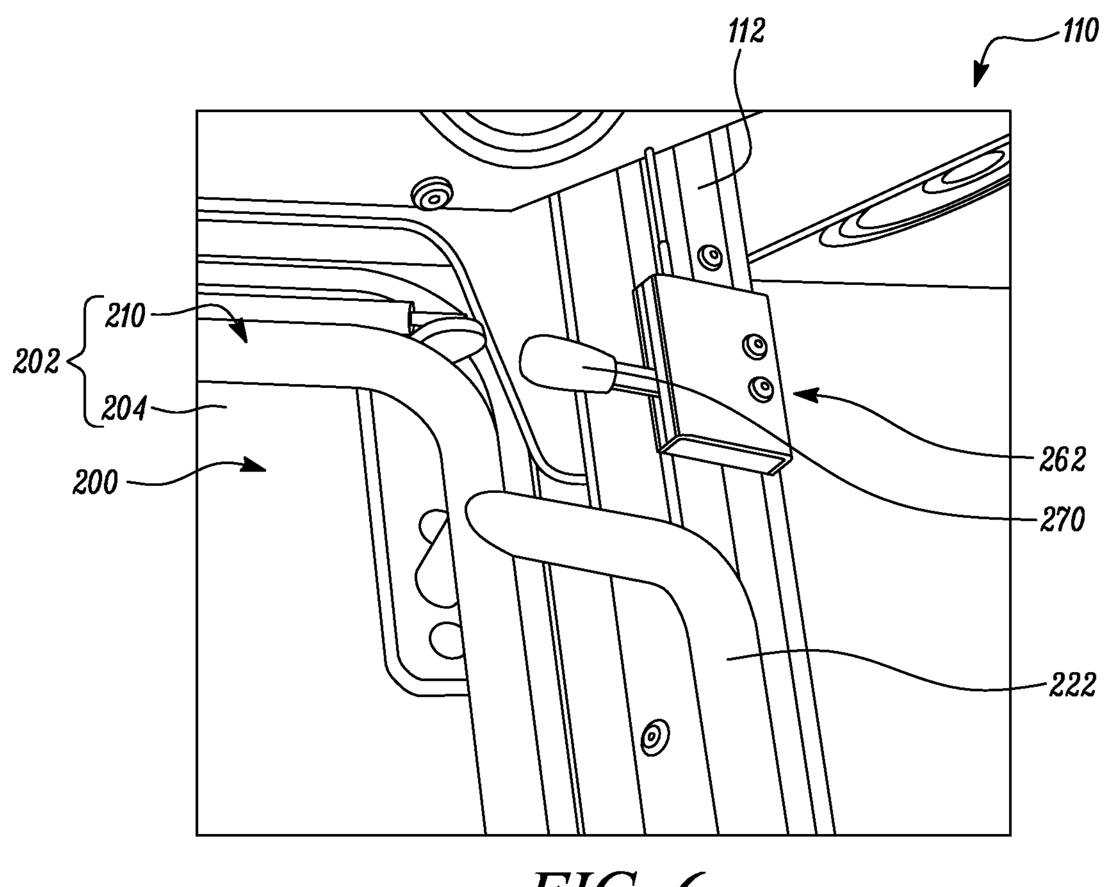
FIG. 6 is a schematic perspective view illustrating an inside view of an operator cabin of the work machine of FIG. 1.

Referring to FIG. 6, a portion of an interior of the operator cabin 110 associated with the work machine 100 of FIG. 1 is illustrated. The work machine 100 includes a latch release mechanism 262. Particularly, the latch release mechanism 262 is disposed inside the operator cabin 110 and is coupled to the frame 112 of the operator cabin 110. The latch release mechanism 262 may allow the operator to release the third latching mechanism 260 (see FIG. 5), thereby disengaging the first section 202 from the retaining member (not shown). The latch release mechanism 262 includes a lever 270. The operator may operate the lever 270 to disengage the striker 266 (see FIG. 5) from the retaining member.

Referring now to FIG. 7, the door 200 is illustrated in the closed position. Specifically, each of the first and second sections 202, 212 are in the closed position. The work machine 100 also includes a door trim 264 extending along a periphery 213 of the door 200. The door trim 264 encloses an area between the door 200 and the frame 112 of the operator cabin 110. The work machine 100 includes a lever 272 coupled to the second surface 208 of the first section 202. The lever 272 may allow the operator to open the door 200 from outside in order to allow the operator to enter the work machine 100. The work machine 100 also includes a handle 284 fixedly coupled to the frame 112 of the work machine 100.

The door 200 further includes a second seal 286 disposed on the second section 212. Particularly, the second seal 286 is disposed on the frame portion 214 of the second section 212. When the first section 202 is in the closed position, the second seal 286 engages with the first glass portion 204 of the first section 202 to provide sealing between the first section 202 and the second section 212. In some examples, the second seal 286 may include a rubber seal.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the door 200 for the work machine 100. The door 200 includes the first section 202 and the second section 212. The first section 202 includes the first glass portion 204 that may provide the operator a clear view of a surrounding area of the work machine 100. The first glass portion 204 may provide sufficient ambient light inside the operator cabin 110 that may enhance operator's driving experience. Further, the first section 202 is movable relative to the second section 212. The first section 202 is movable by the angle of at least 180 degrees relative to the frame 112 of the operator cabin 110. The first section 202 may allow the operator to monitor work operations while being seated within the operator cabin 110. For example, the first section 202 may allow the operator to monitor the edges of the roller drums 114, 116 while the work machine 100 is performing compaction operations, which may improve an efficiency of the compaction operations.

The first section 202 of the door 200 covers up to 70% (approximately) of a total area of the door 200. Also, the first section 202 is lighter in weight as the first section 202 includes a frameless design and majorly constitutes the first glass portion 204 and has lesser volume of metallic material. Further, the first section 202 also includes the handrail 210. The handrail 210 is a structural member that is route in such a way that when the door 200 is in the closed position, the handrail 210 follows cabin post visibility obstruction area. The handrail 210 extends along the entirety of the periphery 211 of the first glass portion 204 such that the handrail 210 may provide sufficient strength to the first section 202. Particularly, the handrail 210 may increase the strength of the first section 202 of the door 200 by at least 80%, as compared to conventional doors having frameless design with a handrail that partially extends along a periphery of such doors. The handrail 210 extending along the entirety of the periphery 211 of the first glass portion 204 may improve sealing of the first glass portion 204 with the frame 112 of the operator cabin 110, which may prevent entry of water, dust, debris, or any foreign particles inside the operator cabin 110. Further, the improved sealing provided by the handrail 210 may also increase thermal insulation inside the operator cabin 110, thereby improving heating, ventilation, and air conditioning performance of the work machine 100.

Further, the fourth portion 282 of the handrail 210 has the angled design that may act as a mechanical protector to a seat inside the operator cabin 110 to avoid direct contact between the seat and the door 200.

The handrail 210 is coupled to the first glass portion 204 with optimum torque. The handrail 210 is coupled to the frame 112 of the operator cabin 110 via the first coupling plates 227 and the coupling plates 229, instead of being coupled via the first glass portion 204. Thus, the first glass portion 204 may not be subjected to any load/stress, thereby preventing damage of the first glass portion 204. Further, the door 200 include the first seals 285 disposed around the first glass portion 204. The first seals 285 may prevent the first glass portion 204 from any damage. Specifically, the first seals 285 may prevent direct contact of the first glass portion 204 with the handrail 210, the first coupling plates 227, or the coupling plates 229. During movement of the first section 202 between the closed position and the open position, a load (for example, a torsional load) may be transferred from the handrail 210 to the first hinges 244 and the first seals 285 to prevent damage to the first glass portion 204.

The door 200 also includes the first gas strut 248 and the second gas strut 254. The first gas strut 248 may provide stability to the first section 202. Further, the second gas strut 254 may provide stability to the second section 212 of the door 200 and may limit the travel of the second section 212 for example, beyond 90 degrees. Each of the first gas strut 248 and the second gas strut 254 may facilitate opening of the first section 202 and the second section 212 by at least 180 degrees and 90 degrees, respectively. Further, the first gas strut 248 and the second gas strut 254 may mitigate shocks due to sudden movements of the first and second sections 202, 212, respectively.

The door 200 further includes the first handle 222 coupled to the third portion 280 of the handrail 210. The design and the position of the first handle 222 on the third portion 280 may be such that the first handle 222 does not obstruct the field of view of the operator present inside the operator cabin 110. The first handle 222 may provide easy access for the operator to open or close the first section 202 of the door 200. The door 200 also includes the second handle 224 fixedly coupled to the frame portion 214 of the second section 212. The second handle 224 may have a smooth and a long transition design such that the operator may easily open or close the second section 212 of the door 200. Further, the second handle 224 may be positioned on the frame portion 214 in such a way that the second handle 224 does not contact the seat of the operator inside the operator cabin 110. Furthermore, the first handle 222, the second handle 224, and the handle 284 may provide three points of contact to the operator to easily board the work machine 100.

The door 200 also includes the first latching mechanism 228. The first latching mechanism 228 includes the latch 230 that may be ergonomically located on the first surface 206 of the first section 202. The latch 230 may be easy to operate and access by the operator to move the first section 202 from the closed position to the open position. The door 200 further includes the second latching mechanism 234. The second latching mechanism 234 includes the foot-operated pedal 238 that may provide an ergonomic advantage over a conventional hand operated latching mechanism.

The door 200 further includes the third latching mechanism 260 coupled to the second surface 208 of the first glass portion 204. The third latching mechanism 260 is directly coupled to the handrail 210, that may prevent damage to the first glass portion 204 while the third latching mechanism 260 engages/disengages from the retaining member on the frame 112 of the operator cabin 110. The door 200 also includes the latch release mechanism 262 that allows release of the third latching mechanism 260 and thereby the first section 202 from the frame 112 of the operator cabin 110. The latch release mechanism 262 may be ergonomically located inside the operator cabin 110 such that the latch release mechanism 262 may be easy to access for operators. The work machine 100 further includes the door trim 264 extending along the periphery 213 of the door 200. The door trim 264 may have an aesthetic look and may prevent entry of water, snow, dust, and the like inside the operator cabin 110.

The door 200 further includes the second seal 286 disposed on the frame portion 214 of the second section 212. When the first section 202 is in closed position, the second seal 286 engages with the first glass portion 204 of the first section 202 and provides sealing between the first section 202 and the second section 212. Further, when each of the first section 202 and the second section 212 are in closed position, the second seal 286 may allow the first section 202 and the second section 212 to form a planar/flush profile, thereby forming an aesthetic finish look. Further, the second seal 286 may prevent entry of water, dust, snow, and the like inside the operator cabin 110, when the first section 202 is in closed position.

Overall, the door 200 of the present disclosure may have an ergonomic frame split design that may improve the efficiency of work operations, may be light in weight, and may have improved structural strength.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A door for a work machine, the door comprising:

a first section including:

a first glass portion defining an inner, first surface and an outer, second surface opposite the first surface;

a handrail coupled to the first glass portion at the first surface of the first glass portion such that the handrail is inward of the inner, first surface of the first glass portion, wherein the handrail is disposed proximal to a periphery of the first glass portion and extends along an entirety of the periphery of the first glass portion;

a hinge having a first portion mounted to the handrail and disposed outward of the outer, second surface of the first glass portion, the hinge further including a second portion pivotally connected to the first portion and configured to be mounted to a frame of an operator cabin of the work machine; and wherein the first glass portion is intermediate the handrail and the first portion of the hinge, the handrail being inward of the first glass portion and the first portion of the hinge being outward of the first glass portion;

a second section, wherein the first section is movable relative to the second section, the second section including:

a frame portion defining a third surface and a fourth surface opposite the third surface; and a second glass portion;

a first latching mechanism mounted to the handrail, the first latching mechanism movable between a first engaged state and a first disengaged state, wherein, in the first engaged state of the first latching mechanism, the first section engages with the second section, and wherein, in the first disengaged state of the first latching mechanism, the first section is disengaged from the second section; and a second latching mechanism coupled to the second section, the second latching mechanism being movable between a second engaged state and a second disengaged state, wherein, in the second engaged state of the second latching mechanism, the second section engages with the frame of the operator cabin of the work machine, and wherein, in the second disengaged state of the second latching mechanism, the second section is disengaged from the frame of the operator cabin.

2. The door of claim 1, wherein the second latching mechanism includes a linkage assembly and a foot-operated pedal coupled to the linkage assembly, and wherein the linkage assembly and the foot-operated pedal are coupled to the third surface of the frame portion.

3. The door of claim 1, wherein the first section is movable by an angle of at least 180 degrees relative to the frame of the operator cabin.

4. The door of claim 1, wherein the second section is movable by an angle of 90 degrees relative to the frame of the operator cabin.

5. The door of claim 1, wherein the first section includes a first handle fixedly coupled to the handrail of the first section, and wherein the second section includes a second handle fixedly coupled to the frame portion of the second section.

6. The door of claim 1, wherein the first latching mechanism includes a latch coupled to the inner, first surface of the first section, wherein, in the first engaged state of the first latching mechanism, the latch engages with the frame portion of the second section, and wherein, in the first disengaged state of the first latching mechanism, the latch disengages from the frame portion of the second section.

7. The door of claim 1 further comprising a third latching mechanism coupled to the handrail and extending outwards from the outer, second surface of the first glass portion, wherein, in an open position of the first section, the third latching mechanism engages with the frame of the operator cabin to retain the first section in the open position.

8. The door of claim 1, wherein the work machine further includes a door trim extending along a periphery of the door, and wherein the door trim is configured to enclose an area between the door and the frame of the operator cabin.

9. The door of claim 1 further comprising:

one or more second hinges that movably couple the second section with the frame of the operator cabin, wherein the one or more second hinges are coupled to the frame portion of the second section.

10. The door of claim 1, wherein the work machine includes a compactor.

11. A work machine comprising:

an operator cabin including a frame; and a door movably coupled to the frame of the operator cabin, the door including:

a first section including:

a first glass portion defining an inner, first surface facing an interior of the operator cabin and an outer, second surface opposite the first surface;

a handrail coupled to the first glass portion at the inner, first surface of the first glass portion such that the handrail is inward of the inner, first surface of the first glass portion, wherein the handrail is disposed proximal to a periphery of the first glass portion and extends along an entirety of the periphery of the first glass portion;

a hinge having a first portion mounted to the handrail and disposed outward of the outer, second surface of the first glass portion, the hinge further including a second portion pivotally connected to the first portion and coupled to the frame of an operator cabin of the work machine; and wherein the first glass portion is intermediate the handrail and the first portion of the hinge, the handrail being inward of the first glass portion and the first portion of the hinge being outward of the first glass portion;

a second section, wherein the first section is movable relative to the second section, the second section including:

a frame portion defining a third surface facing the interior of the operator cabin and a fourth surface opposite the third surface; and a second glass portion;

a first latching mechanism mounted to the handrail, the first latching mechanism movable between a first engaged state and a first disengaged state, wherein, in the first engaged state of the first latching mechanism, the first section engages with the second section, and wherein, in the first disengaged state of the first latching mechanism, the first section is disengaged from the second section; and a second latching mechanism coupled to the second section, the second latching mechanism being movable between a second engaged state and a second disengaged state, wherein, in the second engaged state of the second latching mechanism, the second section engages with the frame of the operator cabin, and wherein, in the second disengaged state of the second latching mechanism, the second section is disengaged from the frame of the operator cabin.

12. The work machine of claim 11, wherein the second latching mechanism includes a linkage assembly and a foot-operated pedal coupled to the linkage assembly, and wherein the linkage assembly and the foot-operated pedal are coupled to the third surface of the frame portion.

13. The work machine of claim 11, wherein the first section is movable at least by an angle of 180 degrees relative to the frame of the operator cabin.

14. The work machine of claim 11, wherein the second section is movable by an angle of 90 degrees relative to the frame of the operator cabin.

15. The work machine of claim 11, wherein the first section includes a first handle fixedly coupled to the handrail of the first section, and wherein the second section includes a second handle fixedly coupled to the frame portion of the second section.

16. The work machine of claim 11, wherein the first latching mechanism includes a latch coupled to the inner, first surface of the first section, wherein, in the first engaged state of the first latching mechanism, the latch engages with the frame portion of the second section, and wherein, in the first disengaged state of the first latching mechanism, the latch disengages from the frame portion of the second section.

17. The work machine of claim 11, wherein the door further includes a third latching mechanism coupled to the handrail and extending outwards from the outer, second surface of the first glass portion, wherein, in an open position of the first section, the third latching mechanism engages with the frame of the operator cabin to retain the first section in the open position.

18. The work machine of claim 11, wherein the work machine further includes a door trim extending along a periphery of the door, and wherein the door trim is configured to enclose an area between the door and the frame of the operator cabin.

19. The work machine of claim 11, wherein the door further includes:

one or more second hinges that movably couple the second section with the frame of the operator cabin, wherein the one or more second hinges are coupled to the frame portion of the second section.

20. The work machine of claim 11, wherein the work machine includes a compactor.

* * * * *